(12) United States Patent
Birke et al.

(10) Patent No.: US 6,693,056 B1
(45) Date of Patent: Feb. 17, 2004

(54) PROCESS FOR PASSIVATING PYROPHOROUS CATALYSTS

(75) Inventors: Peter Birke, Langenbogen (DE); Reinhard Geyer, Halle (DE); Wigbert Himmel, Naumburg (DE); Jurgen Hunold, Halle (DE); Wolfgang Kogler, Halle (DE); Rainer Schodel, Teutschenthal (DE)

(73) Assignee: Kataleuna GmbH Catalysts (DE)

( * ) Notice: Subject to any disclaimer, the term of this patent is extended or adjusted under 35 U.S.C. 154(b) by 0 days.

(21) Appl. No.: 09/914,511

(22) PCT Filed: Mar. 1, 2000

(86) PCT No.: PCT/EP00/01710

§ 371 (c)(1),
(2), (4) Date: Nov. 30, 2001

(87) PCT Pub. No.: WO00/51733

PCT Pub. Date: Sep. 8, 2000

(30) Foreign Application Priority Data

Mar. 3, 1999 (DE) .......................... 199 09 175

(51) Int. Cl.[7] .............. B01J 38/04; B01J 38/12
(52) U.S. Cl. ........................... 502/34; 502/38
(58) Field of Search ..................... 502/34, 38

(56) References Cited

U.S. PATENT DOCUMENTS

| 2,565,347 | A |   | 8/1951 | Bremmer et al. ........... 252/461 |
| 3,033,802 | A |   | 5/1962 | Pedigo |
| 3,868,332 | A |   | 2/1975 | Carter et al. ................. 252/452 |
| 4,090,980 | A |   | 5/1978 | Carter et al. |
| 5,953,911 | A | * | 9/1999 | Guth et al. .................... 60/295 |
| 5,958,816 | A | * | 9/1999 | Neuman et al. ............... 502/38 |

FOREIGN PATENT DOCUMENTS

| DE | 1299286 | 7/1969 |
| DE | 2209000 | 9/1972 |
| DE | 2530818 | 1/1977 |
| DE | 156169 | 8/1982 |
| DE | 156345 | 8/1982 |
| DE | 156347 | 8/1982 |
| DE | 157161 | 10/1982 |
| DE | 3629631 | 3/1988 |
| EP | 0089761 | 9/1983 |
| RU | 68600 | 7/1981 |

OTHER PUBLICATIONS

Database WPI; Section Ch, Week 198639; Derwent Publications Ltd., London, G.B.; AN 1986–256656; XP002140053 & RO 88 849 A (Inst. Chim Energ Chim); Mar. 31, 1986.

* cited by examiner

*Primary Examiner*—Stanley S. Silverman
*Assistant Examiner*—Jonas N. Strickland
(74) *Attorney, Agent, or Firm*—Ostrolenk, Faber, Gerb & Soffen, LLP

(57) ABSTRACT

The present invention relates to a process for passivating pyrophorous solids by using nitrogen, carbon dioxide and oxygen under closely defined conditions to obtain a uniformly passivated solid.

23 Claims, No Drawings

PROCESS FOR PASSIVATING PYROPHOROUS CATALYSTS

DESCRIPTION

The present invention relates to a process for passivating pyrophorous solids, especially catalysts, and the thus prepared solids themselves.

The passivation of supported nickel catalysts is known. Existing processes rely in many cases on a partial oxidation of the metal surface. DE-B-1 299 286, DE-A-2 209 000 and DE-A-2 530 818 describe passivation processes in aqueous solution. The oxidizing agents used are hydrogen peroxide, hypochlorites or oxygen. The processes described, however, are not universally useful, since there are many applications where the water has to be removed before use of the catalyst.

U.S. Pat. No. 2,565,347, U.S. Pat. No. 3,868,332, DD 156 169, DD 156 345, DD 156 347, DD 157 161 and RO 68 600 disclose the passivation of pyrophorous nickel-containing catalysts with oxygen-containing nitrogen. In the processes described, the catalyst is purged with nitrogen prior to passivation to desorb hydrogen from the catalyst surface. The disclosed processes differ from each other with regard to the temperature settings for the desorption and the passivation. One of the disadvantages of the processes described is that they provide, when practiced on an industrial scale, non-uniform products and require long passivation times.

EP-A 89 761 describes the passivation of a nickel-$Al_2O_3$ catalyst by treating the catalyst with $CO_2$ at temperatures of 175 to 200° C. for a period of at least 30 minutes and subsequent cooling in $CO_2$ to ambient temperature.

U.S. Pat. No. 4,090,980 discloses the passivation of a catalyst with an oxygen-nitrogen mixture after prior treatment with $CO_2$, which comprises treating the reduced catalyst with an inert gas by circulating the inert gas through it at a catalyst temperature of 149° C., then cooling the catalyst to a temperature of 10 to 38° C., then progressively increasing the $CO_2$ content in the circulating gas to 80% by volume and subsequently adding oxygen to obtain a concentration of 0.05% by volume. The treatment with this mixture is carried on until 25% of the monolayer of the catalyst surface is coated with oxygen. The oxygen concentration is then raised to 1% by volume and, after the monolayer on the catalyst surface has been completely formed by oxygen species, the oxygen content is slowly raised and the $CO_2$ content of the gas mixture reduced.

A combined $CO_2$ and $O_2$ treatment is also disclosed in SU 1 344 404. In this passivation process, the catalyst is treated with $CO_2$ at temperatures of 250 to 300° C., subsequently in the $CO_2$—$O_2$ mixture with oxygen concentrations of 0.4 to 2% by volume at temperatures of 100 to 250° C. for a period of 20 minutes, the catalyst is cooled down to ambient temperature under $CO_2$ and subsequently air is flowed through the catalyst bed.

DE 3 629 631 describes the passivation of nickel-containing catalysts with $CO_2$, steam or oxygen. When the passivation has been carried out with $CO_2$ in the temperature range from 25 to 250° C., this disclosure requires that the $CO_2$ treatment be followed by a further passivation with oxygen-nitrogen mixtures.

In summary it can be stated that existing passivation processes require very long passivation times, especially to passivate with oxygen-nitrogen mixtures, and so are very costly and, what is more, provide nonuniformly passivated catalysts.

It is an object of the present invention to provide a process for passivating pyrophorous solids, especially pyrophorous catalysts, that leads to more uniformly passivated solids, especially catalysts, at low cost.

This object is achieved by a process for passivating a preferably reduced and/or preferably inertized pyrophorous solid, especially a catalyst, particularly preferably a supported metal catalyst, wherein the catalyst a) is treated in a $CO_2$—$N_2$ gas mixture having a $CO_2$ content of 0.5 to 10% by volume at temperatures of 91° C. to 350° C. for at least 30 minutes, b) then cooled down to a temperature of not more than 90° C. in the $CO_2$—$N_2$ gas mixture of step a), c) after reaching the temperature mentioned in step b) oxygen, preferably air, is added to the $CO_2$—$N_2$ gas mixture in a first passivation phase up to a content of 0.2 to 1.5% by volume and the catalyst is treated in the $CO_2$—$N_2$—$O_2$ gas mixture for at least 30 minutes by shaking, d) and then in a second passivation phase, with shaking, the $CO_2$ content in the $CO_2$—$N_2$—$O_2$ gas mixture is lowered to <0.1% by volume and the $O_2$ content is raised to 1.5—21% by volume.

The process of the invention has the advantage of short stabilization times while at the same time providing readily reactivable catalysts possessing very good thermal stability. Advantageously, the catalysts are passivated particularly uniformly. It is in fact surprising that the treatment with low-$CO_2$ inert gases under the stated conditions provides very uniformly and easily reactivable catalysts.

For the purposes of the present invention, a pyrophorous solid is a solid body that ignites, or tends to ignite, spontaneously, especially a body that will spontaneously combust in air when exposed to it in a state of very fine subdivision.

In a particularly preferred embodiment, the invention provides an aforementioned process wherein the pyrophorous solid is a pyrophorous supported metal catalyst. The invention accordingly provides for example supported metal catalysts wherein the metal component is nickel, cobalt, copper, iron, aluminum, zinc or mixtures or alloys of two or more thereof. In a preferred embodiment, the support component of the supported metal catalyst used according to the invention consists of or contains for example $Al_2O_3$, $SiO_2$, $SiO_2 \cdot Al_2O_3$, $TiO_2$, $ZrO_2$, mixtures of these oxides, activated carbon, zeolites, clays, natural silicates or mixtures of two or more thereof. The invention also provides that the supports may have been chemically modified, for example by treatment with phosphate, sulfate, fluoride or chloride compounds. It will be appreciated that, according to the invention, it is also possible for the pyrophorous supported metal catalyst used to be doped, for example by additions of elements of the sixth to eight transition group of the Periodic Table of the Elements, such as platinum, palladium, rhodium, chromium, tantalum, titanium, iron or their mixtures etc.

It will be appreciated that the supported metal catalyst used according to the invention can additionally a contain additive materials such as molding assistants, lubricants, plasticizers, pore-formers, moisteners, etc.

The herein described process for passivating a solid starts with a reduced and inertized solid. The solid, especially a catalyst, can be reduced by treating the catalyst in a hydrogen stream at elevated temperatures. After reduction, the catalyst is, if appropriate, inertized in a nitrogen stream. The invention thus provides in a preferred embodiment that the solid, especially a catalyst, to be passivated is reduced and/or inertized before passivation. The reducing can be effected by treating the solid with a hydrogen stream at temperatures of 250 to 500° C., a volume hourly space velocity of 250 to 300 v/v h and a heating rate of 50° C./h to 200° C./h, preferably at periods of 2 hours to 16 hours at reduction temperature. This can be followed by an inertization under the following conditions: at reduction temperature the hydrogen stream is switched over to a nitrogen stream, inertization is carried out at this temperature for about 30 minutes and this is followed by cooling down in the nitrogen stream to the temperature of the treatment with the $N_2$—$CO_2$ mixture, the $N_2$ volume hourly space velocity being 250 to 3 000 v/v h.

The oxygen to be added during the first passivation phase of step c) can preferably be added by adding air up to the stated oxygen concentration. It will be appreciated, however, that the oxygen can also be added in pure form for example.

In a preferred embodiment of an aforementioned process provided according to the invention, the process according to the invention is continuously or batch operated in a catalyst bed, especially in a catalyst bed whose height to diameter ratio is in the range from 0.05 to 1.

In a further preferred embodiment, the concentration of the $CO_2$ during the treatment with the $CO_2$—$N_2$ mixture as per the first step a) is 1 to 2.5% by volume.

In a further preferred embodiment, the volume hourly space velocity during the treatment with the $CO_2$—$N_2$ mixture as per the first step a) is 500 to 10 000 v/v h. In a further preferred embodiment, the volume hourly space velocity during the treatment with the $CO_2$—$N_2$ mixture as per the first step a) and/or during the treatment with the $CO_2$—$N_2$—$O_2$ gas mixture as per the third and fourth steps c) and d) is 100 to 3 000 v/v h.

In a further preferred embodiment, the treatment in the $CO_2$—$N_2$—$O_2$ gas mixture as per the third and fourth steps c) and d) is carried out for a period of more than 30 minutes, for example 33 minutes to 8 hours. Step d) can be carried out for a period of not less than 3 minutes, in a preferred embodiment.

In a further development of the aforementioned process, the ratio of the duration of the treatment as per the third step c), i.e., the first passivation phase, to the duration of the fourth step d), i.e., the second passivation phase, is 9:1.

In a further preferred embodiment, the temperature of the treatment of the catalyst with the $CO_2$—$N_2$—$O_2$ gas mixture of step c) and/or d) is 50 to 70° C.

In a further preferred embodiment, the $CO_2$ concentration in the $CO_2$—$N_2$—$O_2$ gas mixture during the treatment of the third step c) is 0.5 to 1.5% by volume. In a preferred embodiment, the $CO_2$ content of the mixture from step a) can be lowered, for example to the aforementioned range, for the duration of step c).

In a further preferred embodiment of the present invention, there is provided an aforementioned process wherein the $O_2$ concentration in the $CO_2$—$N_2$—$O_2$ gas mixture during the treatment of the third step c) is 0.25 to 0.8% by volume.

In a further preferred embodiment of the invention, the $O_2$ concentration during the treatment of the fourth step d) is 5 to 10% by volume.

In a further embodiment, the invention provides an aforementioned process wherein the shaking of the catalyst bed during steps c) and/or d) is effected at intervals of 10 to 20 minutes for a period of 0.5 to 2 minutes in each case. It is advantageous to employ shaking frequencies of 10 to 50 Hz.

It will be appreciated that it is also possible, especially in the case of pulverulent catalysts and catalysts possessing very high strengths, to agitate the catalyst bed by fluidization or disposition in a rotary tube oven. At any rate, it is an essential aspect of the present invention to agitate the catalyst in the oxygen-carbon dioxide-nitrogen mixture at least temporarily during the passivation phases of steps c) and d), for example in a moving bed.

The invention also provides a passivated solid, especially a passivated supported metal catalyst, prepared according to one of the subject processes. Such catalysts are notable for good reactivability, excellent thermal air stability and uniform passivation.

The examples hereinbelow illustrate the invention.

EXAMPLES

The inventive and comparative examples were carried out using an Ni-$SiO_2$ catalyst (2 mm extrudates) having an Ni content of 62.6% by mass, which prior to passivation was reduced by the following process: 25 l of the catalyst were subjected to a hydrogen stream at a volume hourly space velocity of 1 250 v/v h while being heated to 445° C. at a rate of 50° C./h and reduced at 445° C. for 5 hours. The reduced catalyst has an Ni surface area of 42.9 $m^2/g_{cat}$.

Example 1 (Inventive)

The passivation is carried out in a reactor which is equipped with a shaking apparatus and in which the height to diameter ratio of the catalyst bed is 0.2. After reduction, the catalyst is cooled down to 300° C. in a nitrogen stream at a volume hourly space velocity of 2 000 v/v h. At 300° C., $CO_2$ is added to the nitrogen until a concentration of 1.5% by volume is measured in the circulating gas. The catalyst is then cooled down to 60° C. in this gas mixture in the course of 1 hour. After attaining 60° C., air is added to an $O_2$ content of 0.25% by volume, the $CO_2$ content in the circulating gas lowered to 0.8% by volume and the catalyst treated with this gas mixture for 2.5 hours. During this treatment at 60° C., the catalyst bed is shaken at a frequency of 35 Hz for a period of 40 seconds at intervals of 15 minutes. The $O_2$ content is then raised to 5% by volume, the $CO_2$ content lowered to 0.05% by volume and the catalyst treated in this gas mixture for 15 minutes. The total stabilization time is about 4.5 hours.

Example 2

The passivation is carried out in the same reactor as in inventive example 1. After reduction, the catalyst is cooled down to 180° C. in a nitrogen stream at a volume hourly space velocity of 1 500 v/v h. At 180° C., $CO_2$ is added to the nitrogen until a concentration of 2.5% by volume is measured in the circulating gas. The catalyst is treated with the $CO_2$—$N_2$ mixture at 180° C. for 30 minutes and then cooled down to 50° C. in this gas mixture in the course of 0.5 hours and, after air is added the catalyst is stabilized for 3 hours at this temperature with a circulating $O_2$—$CO_2$—$N_2$ mixture having a $CO_2$ content of 1.8% by volume and an $O_2$ content of 0.5% by volume. During this treatment at 50° C., the catalyst bed is shaken at a frequency of 35 Hz for a period of 40 seconds at intervals of 10 minutes. The $O_2$ content is then raised to 8% by volume, the $CO_2$ content lowered to 0.05% by volume and the catalyst treated in this gas mixture for 20 minutes. The total stabilization time is about 5 hours.

Example 3 (Comparative)

The stabilization was carried out in a tubular oven having a height to diameter ratio of 8 for the catalyst bed. After reduction, the catalyst is cooled down to 40° C. in a nitrogen stream at a volume hourly space velocity of 1 500 v/v h. At 40° C., $O_2$ is added to the nitrogen until a concentration of 0.3% by volume is measured in the circulating gas. The catalyst is then treated in this $O_2$—$N_2$ mixture for 20 hours. Finally the $O_2$ content is raised to 8% by volume and the catalyst is treated in this gas mixture for 50 minutes. The total stabilization time is about 22 hours.

Example 4 (Comparative)

After reduction, the reduced catalyst is cooled down to room temperature in a nitrogen stream, then treated with pure $CO_2$ at a volume hourly space velocity of 1 000 v/v h for a period of 2 hours and finally air is passed through the sample for a period of 19 hours, the air rate chosen being such that the temperature in the catalyst bed does not exceed 80° C. The total stabilization time is about 21 hours.

Example 5 Comparison of Catalysts with Regard to Their Reactivability, Thermal Air Stability and Catalytic Activity The catalysts were characterized by TPR. The TPR investigations were carried out with an Ar—$H_2$ mixture containing 10% by volume of $H_2$; the heating rate was 10° C./minute. The position of the peak in the TPR spectrum was taken as a measure of the reactivability of the passivated catalyst: the lower the position of the peak, the easier the reactivability of the catalyst. The results of the individual examples are summarized in the table.

The thermal air stability of the catalysts was determined as well. To this end, 20 g of each catalyst were heated in air at a rate of 10° C./minute while the temperature in the catalyst bed was monitored. Thermal stability was taken to be measured by the light-off temperature. The light-off temperature is the temperature at which the catalyst starts to burn, which is detectable from a very pronounced temperature rise in the catalyst bed. Light-off temperatures of above 90° C. are desirable for convenient catalyst handling.

The catalytic characteristics of the catalysts were determined in the benzene hydrogenation test: 100 mg of the catalyst were subjected to a hydrogen stream of 3l/h while being heated to 100° C. at a rate of 5° C./minute and maintained at 100° C. for 1 hour for reactivation. A hydrogen-benzene mixture (5l of $H_2$/h, 0.5 ml of benzene/h) is then passed through the catalyst bed. After one hour, the reaction mixture is analyzed by gas chromatography. The degree of conversion of benzene into cyclohexane is a measure of the catalytic activity. The results are likewise summarized in the table.

TABLE

| Catalyst of | Temperature of peak in TPR curve in ° C. | Lightoff temperature in ° C. | Benzene conversion in % |
|---|---|---|---|
| Example 1 (inventive) | 95 | 120 | 36 |
| Example 2 (inventive) | 90 | 123 | 38 |
| Example 3 (comparative) | 184 | 80 | 11 |
| Example 4 (comparative) | 191 | 197 | 6 |

The results are clear in showing the advantages of the process according to the invention. It provides very good thermal air stability for the catalysts coupled with short stabilization times and good reactivability.

What is claimed is:
1. A process for passivating a pyrophorous solid, wherein the solid
   a) is treated in a $CO_2$—$N_2$ gas mixture having a $CO_2$ content of 0.5 to 10% by volume at temperatures of 91° C. to 350° C. for at least 30 minutes,
   b) then cooled down to a temperature of not more than 90° C. in the $CO_2$—$N_2$ gas mixture of step a),
   c) after reaching the temperature of step b) oxygen is added to the $CO_2$—$N_2$ gas mixture in a first passivation phase to a content of 0.2 to 1.5% by volume and the catalyst is treated in the $CO_2$—$N_2$—$O_2$ gas mixture for at least 30 minutes with agitation,
   d) and then in a second passivation phase, with agitation, the $CO_2$ content in the $CO_2$—$N_2$—$O_2$ gas mixture is lowered to <0.1% by volume and the oxygen content is raised to 1.5—21% by volume.
2. A process as claimed in claim 1, wherein the $CO_2$ content during the treatment with the $CO_2$—$N_2$ gas mixture of step a) is 1 to 2.5% by volume.
3. A process as claimed in claim 1, wherein the $O_2$ content in the $CO_2$—$N_2$—$O_2$ gas mixture is 0.25 to 0.8% by volume during the treatment of step c) or 5 to 10% by volume during step d), or both.
4. A process as claimed in claim 1, wherein the solid is a catalytic solid.
5. A process as claimed in claim 4, wherein the solid is a metal-containing catalyst.
6. A process as claimed in claim 5, wherein the solid is reduced prior to step c).
7. A process as claimed in claim 6, wherein the solid is rendered inert prior to passivation and after any reduction.
8. A process as claimed in claim 5, wherein the metal is nickel, cobalt, copper, iron, aluminum, zinc or a mixture or an alloy thereof.
9. A process as claimed in claim 5, wherein the metal is on a support of $SiO_2$, $Al_2O_3$, $SiO_2 \cdot Al_2O_3$, $ZrO_2$, $TiO_2$, clay, zeolite, activated carbon, natural silicate or a mixture thereof.
10. A process as claimed in claim 5, wherein the process is conducted in a catalyst bed.
11. A process as claimed in claim 5, wherein the $CO_2$ content during the treatment with the $CO_2$—$N_2$ gas mixture of step a) is 1 to 2.5% by volume.
12. A process as claimed in claim 5, wherein the volume hourly space velocity during the treatment with the $CO_2$—$N_2$ gas mixture of step a) is 500 to 10,000 v/v h.
13. A process as claimed in claim 12, wherein the volume hourly space velocity during the treatment with the $CO_2$—$N_2$ gas mixture of step a) or the $CO_2$—$N_2$—$O_2$ gas mixture of step c) or step d) is 1,000 to 3,000 v/v h.
14. A process as claimed in claim 5, wherein the catalyst is treated in the $CO_2$—$N_2$—$O_2$ gas mixture of steps c) and d) for longer than 0.5 hours.
15. A process as claimed in claim 5, wherein the temperature of the treatment of the catalyst with the $CO_2$—$N_2$—$O_2$ gas mixture of step c) and step d) is 50 to 70° C.
16. A process as claimed in claim 5, wherein the $CO_2$ content in the $CO_2$—$N_2$—$O_2$ gas mixture during the treatment of step c) is 0.5 to 1.5% by volume.
17. A process as claimed in claim 5, wherein the durations of the treatment in steps c) to d) are in a ratio of 9:1.
18. A process as claimed in claim 5, wherein the $O_2$ content in the $CO_2$—$N_2$—$O_2$ gas mixture is 0.25 to 0.8% by volume during the treatment of step c) or 5 to 10% by volume during step d), or both.
19. A process as claimed in claim 5, wherein the agitation of the catalyst bed during steps c) or d), or both, is effected at intervals of 10 to 20 minutes for a period of 0.5 to 2 minutes in each case.

20. A process as claimed in claim 19, wherein the process is conducted in a bed of catalyst which is a pyrophororus metal selected from the group consisting of nickel, cobalt, copper, iron, aluminum, zinc or a mixture or an alloy thereof on a support of $SiO_2$, $Al_2O_3$, $SiO_2 \cdot Al_2O_3$, $ZrO_2$, $TiO_2$, clay, zeolite, activated carbon, natural silicate or a mixture thereof; the $CO_2$ content during the treatment with the $CO_2$—$N_2$ gas mixture is 1 to 2.5% by volume and the volume hourly space velocity is 500 to 10,000 v/v h during the treatment with the $CO_2$—$N_2$ gas mixture of step a); the catalyst is treated in the $CO_2$—$N_2$—$O_2$ gas mixture of steps c) and d) at a temperature of 50 to 70° C. and for longer than 0.5 hours; the $O_2$ content in the $C_{O2}$—$N_2$—$O_2$ gas mixture is 0.25 to 0.8% by volume during the treatment of step c) or 5 to 10% by volume during step d), or both; and wherein the agitation of the catalyst bed during steps c) or d), or both, is effected at intervals of 10 to 20 minutes for a period of 0.5 to 2 minutes in each case.

21. A process as claimed in claim 20, wherein the process is conducted in a catalyst bed whose height to diameter ratio is in the range from 0.05 to 1; the volume hourly space velocity during the treatment with the $CO_2$—$N_2$ gas mixture of step a) or the $CO_2$—$N_2$—$O_2$ gas mixture of step c) or step d) is 1,000 to 3,000 v/v h; the catalyst is treated in the $CO_2$—$N_2$—$O_2$ gas mixture of steps c) and d) for 33 minutes to 8 hours and the durations of the treatment in steps c) to d) are in a ratio of 9:1; and wherein the $CO_2$ content in the $CO_2$—$N_2$—$O_2$ gas mixture during the treatment of step c) is 0.5 to 1.5% by volume.

22. A process as claimed in claim 21, wherein the solid is reduced and then rendered inert prior to step c).

23. A passivated supported metal catalyst prepared by the process of claim 1.

* * * * *